United States Patent [19]

Baltare

[11] Patent Number: 4,526,254
[45] Date of Patent: Jul. 2, 1985

[54] DRUM BRAKE SPIDER ASSEMBLY WITH REMOVABLE ANCHOR PIN

[75] Inventor: Gunnar Baltare, Portage, Mich.

[73] Assignee: Eaton Corporation, Cleveland, Ohio

[21] Appl. No.: 506,553

[22] Filed: Jun. 21, 1983

[51] Int. Cl.³ .............................................. F16D 65/09
[52] U.S. Cl. ................................. 188/341; 188/206 A; 188/328; 411/518
[58] Field of Search ................. 188/341, 206 A, , 327, 188/328, 78, 206 R, 329; 411/523, 517, 518, 521

[56] References Cited

U.S. PATENT DOCUMENTS

| | | | |
|---|---|---|---|
| 1,832,136 | 12/1931 | Oliver | 188/206 A |
| 2,371,168 | 3/1945 | Hawley | 188/329 |
| 2,710,076 | 6/1955 | Russell | 188/330 |
| 2,897,022 | 7/1959 | Marola | 411/518 X |
| 3,136,390 | 6/1964 | Zukowski | 188/341 |
| 3,177,979 | 4/1965 | Powlas | 188/341 |
| 3,650,360 | 3/1972 | King et al. | 188/330 |
| 4,157,747 | 6/1979 | Getz et al. | 188/341 |
| 4,206,834 | 6/1980 | Williams | 188/341 |
| 4,440,274 | 4/1984 | Claydon | 188/341 X |

FOREIGN PATENT DOCUMENTS

| | | | |
|---|---|---|---|
| 282171 | 7/1952 | Switzerland | 411/517 |
| 541605 | 12/1941 | United Kingdom | 188/206 A |

Primary Examiner—Bruce H. Stoner, Jr.
Assistant Examiner—Michael P. Gilday
Attorney, Agent, or Firm—C. H. Grace; H. D. Gordon

[57] ABSTRACT

A drum brake spider assembly (100) for an expanding shoe drum brake (10) having a removable anchor pin (18) is provided. A spider member (14) is provided with an anchor pin receiving bore (39) in which the anchor pin is removably received. The anchor pin receiving bore is provided with a first counterbore (114) at the inboard end thereof and a second counterbore (118) at the outboard end thereof. The anchor pin is provided with two annular grooves (122 and 124) in which are received first and second snap rings (128 and 130). The diameter (116) of the first counterbore is smaller than the outer diameter of the first snap ring when the snap ring is radially expanded sufficiently to remove same from the first groove in the anchor pin.

9 Claims, 4 Drawing Figures

DRUM BRAKE SPIDER ASSEMBLY WITH REMOVABLE ANCHOR PIN

BACKGROUND OF THE INVENTION

1. Field of the Invention

This invention relates to expanding shoe type drum brakes and in particular to drum brake spider assemblies with removable anchor pins which will permit easy replacement of a deformed, worn and/or dislodged anchor pin.

2. Description of the Prior Art

Drum brakes having a pair of generally arcuate brake shoes pivotably mounted at one end to an anchor structure and selectively actuatable at the other end thereof to pivot radially outwardly relative to the anchor structure to frictionally engage a drum brake are well known in the prior art. Usually, the brake shoes comprise an arcuate table carrying the friction material and at least one radially inwardly extending rib or web. Typically, the pivotably mounted end of the brake shoe webs are formed with either generally concave surfaces or generally annular aperatures which are pivotably supported by an anchor structure comprising a single anchor pin, or a pair of anchor pins, fixed to the brake spider. A resilient retaining member, or members, such as a coil tension spring may be utilized to retain the brake shoes against the anchor member. Examples of such prior art drum brakes may be seen by reference to U.S. Pat. Nos. 2,710,076; 3,398,814 and 3,467,229, all assigned to the assignee of this invention and all hereby incorporated by reference. While these prior art devices are generally satisfactory and enjoy great commercial success, a problem has occasionally existed with the anchor pin, or anchor pins, thereof. The anchor pins of the prior art devices were usually fixedly mounted to a support structure or member, usually referred to as the brake spider, as by a staked press fit. When the anchor pins occasionally became loose, dislodged, worn and/or otherwise damaged, it was difficult to replace them, especially if a press and/or specialized fixtures were not readily available, and often a new spider assembly was required. In certain types of brakes, such as trailer axle brakes, wherein the spider is often welded, or otherwise non-removably retained, to an axle housing, this situation was particularly unsatisfactory.

SUMMARY OF THE INVENTION

In accordance with the present invention, the drawbacks of the prior art have been reduced or eliminated by the provision of a drum brake spider assembly with a removable anchor pin which will permit relatively quick assembly of an anchor pin to a drum brake spider without the requirement of special fixtures and/or a press and/or removal of the spider from the vehicle. The drum brake spider assembly of the present invention comprises a spider member defining an anchor pin receiving bore therethrough. At the inboard end of the anchor pin receiving bore a first counterbore is provided and at the outboard end of the anchor pin receiving bore a second counterbore is provided. A generally cylindrical anchor pin is provided with a snap ring retaining groove adjacent each end thereof, said grooves axially spaced by a distance generally equal to the axial length of the anchor pin receiving bore. The first counterbore has an inner radius slightly larger than the outer radius of the installed snap ring received within one of the grooves in the anchor pin and the second counterbore has an inner radius considerably larger than the outer diameter of the installed snap ring received within the other groove in the anchor pin. The first counterbore inner diameter is smaller than the outer diameter of the snap ring received in the inboard anchor pin groove when said snap ring is outwardly deflected sufficiently for removal from one of the grooves provided in the anchor pin while the second counterbore inner diameter is greater than the outer diameter of the snap ring received in the outboard anchor pin groove when outwardly deflected sufficiently for removal from one of the grooves in the anchor pin. Accordingly, the snap ring seated within the inboard groove in the anchor pin and axially aligned with the first counterbore is prevented from radially outward deflection sufficient to unseat said snap ring from said groove while the outboard snap ring may be selectively removed from the anchor pin while within the second counterbore.

In the preferred embodiment, the anchor pin supporting end of the spider is off set to the outboard ends of the vehicle relative to the cam shaft end of the spider, accordingly the anchor pins will tend to move toward the outboard direction and will be retained in the spider against such tendency by the inboard snap ring as trappingly received within the first or inboard counterbore in the anchor pin retaining groove. When removal of the anchor pin is required, the snap ring at the outboard or more accessible end of the anchor pin is simply radially outwardly deflected and removed from the groove in the anchor pin and then the anchor pin is slid inboardly sufficiently to clear the anchor pin receiving bore in the spider. Assembly of the anchor pin to the spider is accomplished in the opposite manner.

Accordingly, it is an object the present invention to provide a new and improved drum brake spider assembly with removable anchor pin.

This and other objects and advantages of the present invention will become apparent from a reading of the detailed description of the invention taken in connection with the drawings.

DESCRIPTION OF THE PREFERRED EMBODIMENT

Figure 1:
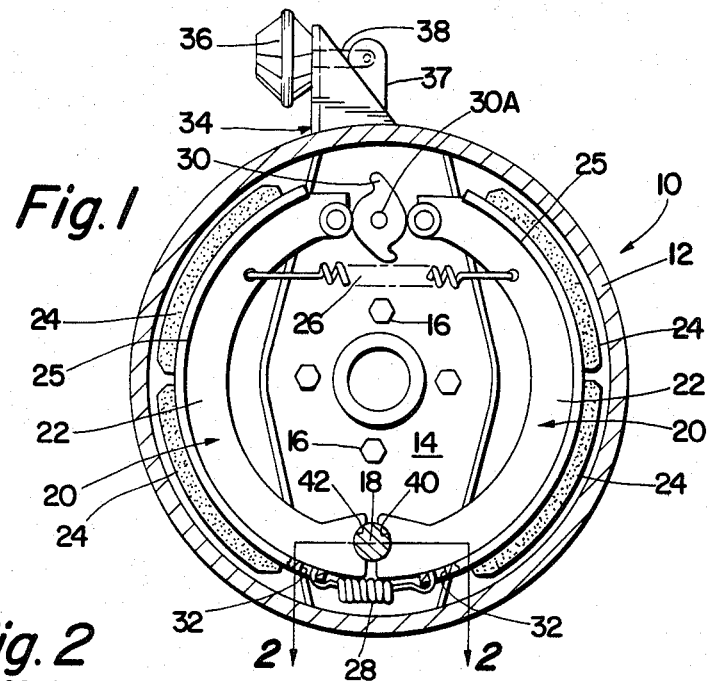
FIG. 1 is an illustration of the outboard side of an expanding shoe drum brake of the type with which the present invention may be utilized.

Certain terminology will be used in the following description for convenience in reference only and will not be limiting. The words "upwardly," "downwardly," "rightwardly," and "leftwardly," will designate directions in the drawings to which reference is made. The words "inwardly" and "outwardly" will refer to directions toward and away from, respectively, the geometric center of the designated parts. The words "inboard" and "outboard" will refer, in conventionally mounted spiders, to directions toward and away from, respectively, the geometric center of the vehicle to which the drum brakes illustrated in the drawings is attached. In brakes wherein the spider is cantilever mounted at the axially outer ends thereof to the vehicle, the terms "inboard" and "outboard" will refer to directions toward and away from, respectively, the cantilever mounting. Said terminology will include the words above specifically mentioned, derivatives thereof and words of similar import.

Drum brake assembly 10 comprises an annular rotatable brake drum 12, a brake support member or spider 14 non-rotatably secured to the vehicle by a plurality of fasteners 16 received in apertures 16A provided in the spider 14, a brake shoe pivot or anchor pin 18 removably secured to the spider 14, a pair of opposed arcuate brake shoes 20 including ribs or webs 22 and a brake lining 24 of suitable friction material carried by the tables 25, brake shoe return spring 26, brake shoe retaining springs 28 for retaining the shoes 20 on anchor pin 18, and a cam element 30 for causing radially outward pivotal movement of the brake shoes 20 about anchor pin 18 for retarding the movement of the vehicle. The retaining springs 28 of brake assembly 10 are tension springs retained in apertures 32 formed in the tables 25.

A brake actuator support, or air motor bracket, 34 is fixed to the spider 14 and a brake actuator, such as air motor 36 is fixed to the actuator support. Oscillatory movement of the actuator 36 is converted into rotational movement of the cam 30 by means of link 38, a lever or slack adjuster body 37 and a cam shaft 30A as is well known in the prior art. Although a rotatable cam 30 is illustrated, other actuation means, such as wedges or the like, may be utilized as is well known in the art.

It is understood, of course, that in those brakes wherein the spider 14 is permanently affixed to the axle housing, apertures 16A and fasteners 16 are eliminated and a surface suitable for welding or the like is provided on the spider 14.

Figure 2:
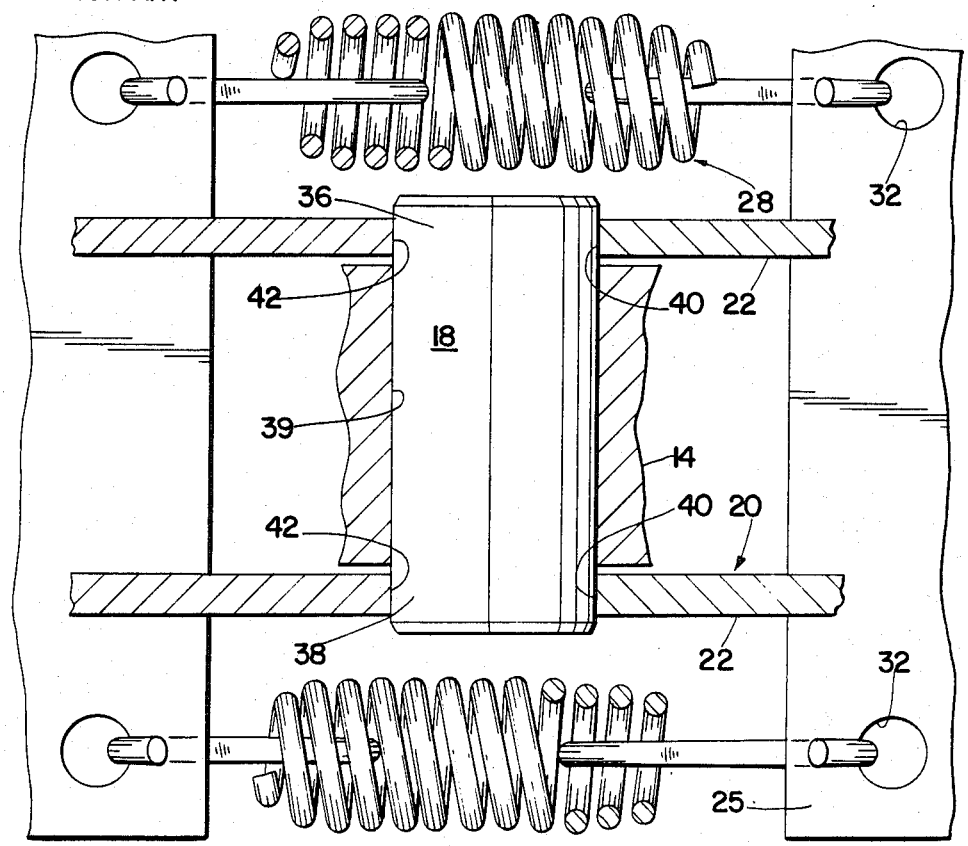
FIG. 2 is a fragmentary view of the anchor pin mounting means of the prior art.

The prior art mounting of anchor pin 18 to spider 14 may be seen by reference to FIG. 2. Briefly, spider 14 is provided with a throughbore 39 in which anchor pin 18 is received in a staked pressed fit. The opposite outer ends, 36 and 38, of the anchor pin 18 will extend axially beyond the bore 39 for pivotal receipt of the concave cavities, 40 and 42, formed in the webs 22. It is understood that, in brakes of the type utilizing two or more anchor pins, the webs may be provided with annular apertures instead of concave cavities. Although assembly of anchor pins to spiders by the method described above and illustrated in FIG. 2 is satisfactory for assembly purposes in a facility, such as a factory, having the proper press equipment and fixtures for assembling unused anchor pins to unused spiders, this method is often not satisfactory if proper equipment and fixtures are not available and/or if the spider has been used for a period of time.

Figure 3:
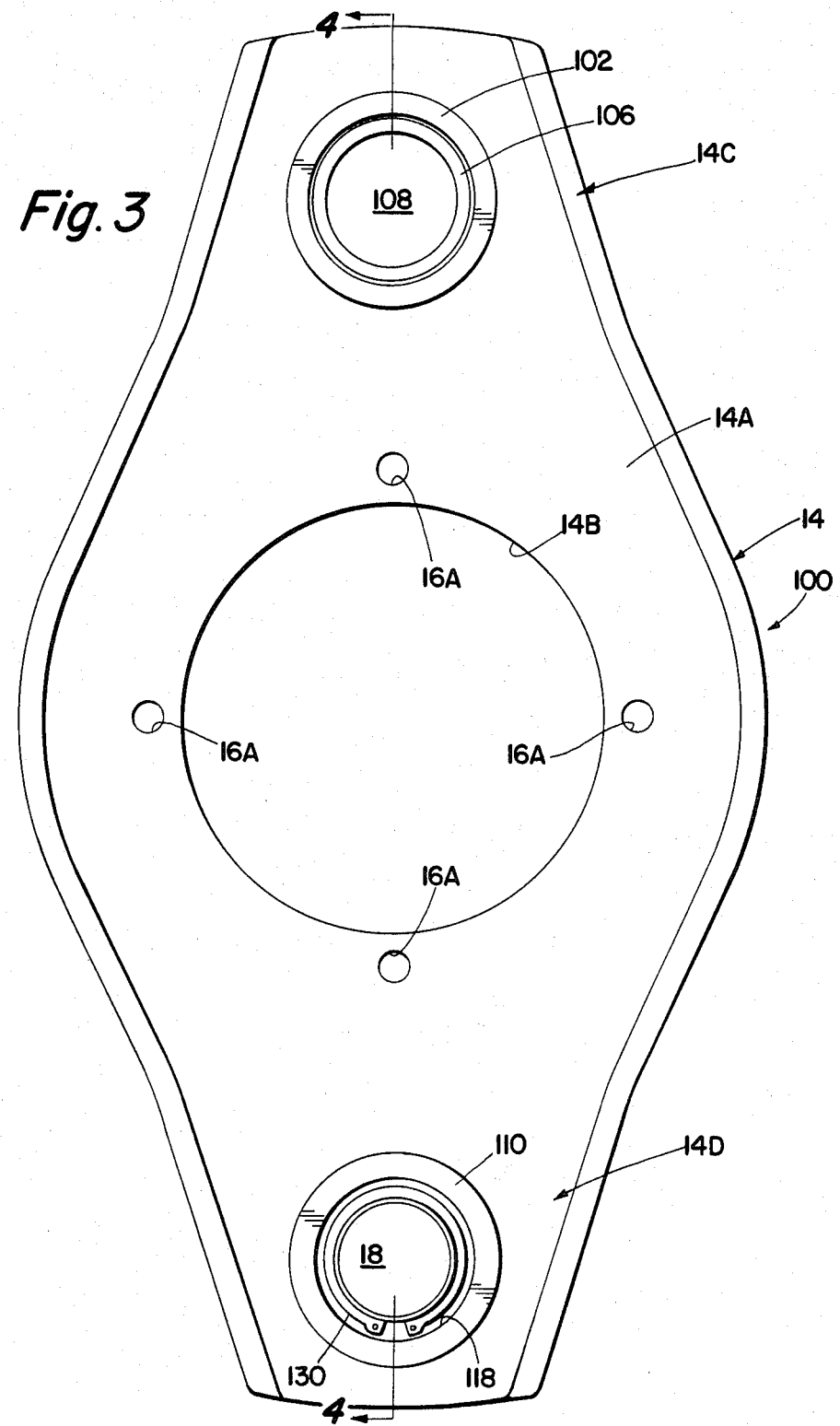
FIG. 3 is a front view of the drum brake spider assembly with removable pin of the present invention.
Figure 4:
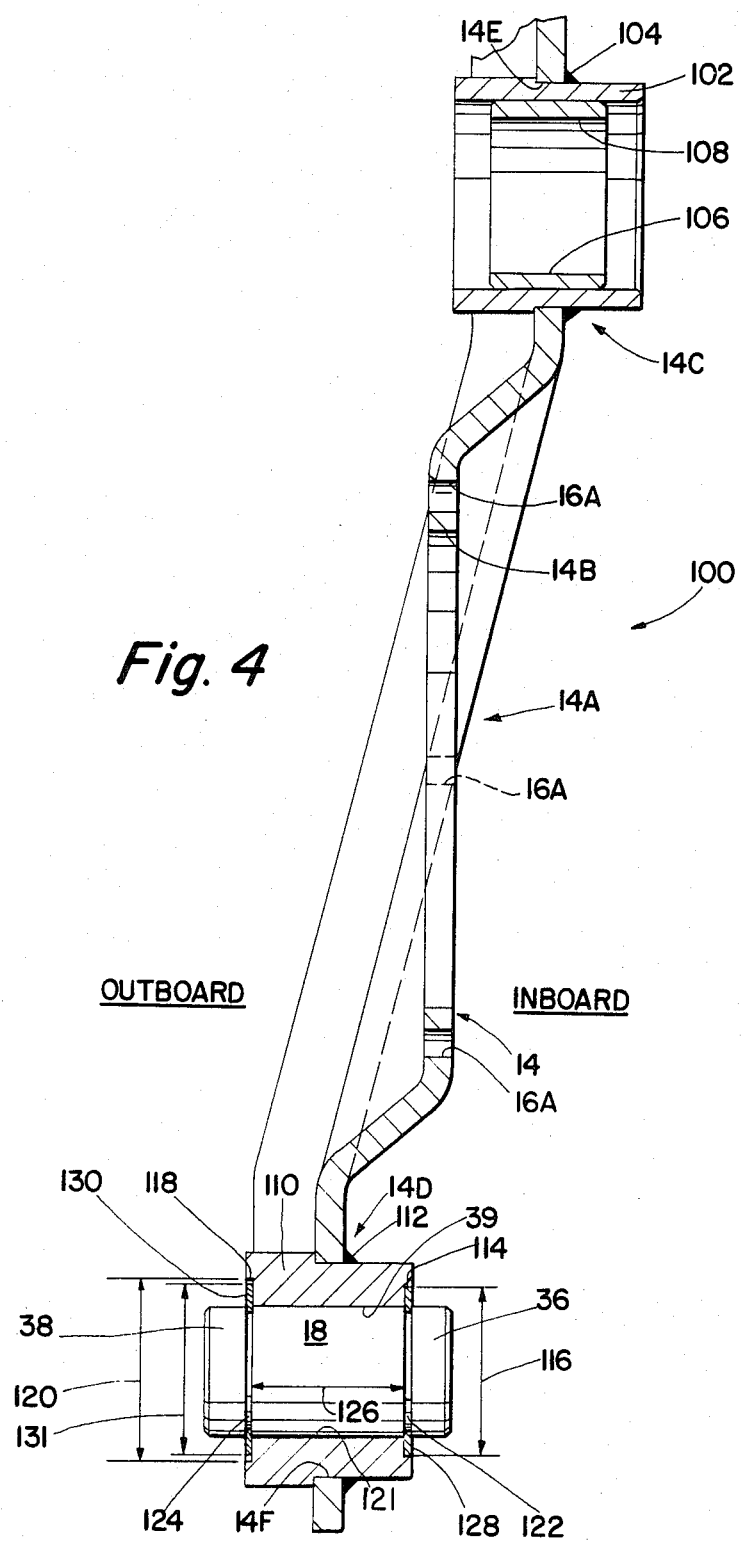
FIG. 4 is a side view, partially in section, of the spider assembly with removable anchor pin of the present invention.

The drum brake spider assembly 100 of the present invention may be seen by reference of FIGS. 3 and 4. Briefly, the assembly 100 includes the spider 14 which defines a central portion 14A having an aperture 14B therethrough for receipt of the end of an axle housing, a cam shaft support section 14C for rotatable support of cam shaft 30A and an anchor pin support section 14D for support of the anchor pin 18. As may be seen by reference to FIG. 4, the anchor pin support section 14D extends axially outwardly (i.e. in the outboard direction) of the cam shaft support section 14C and thus the pivotal movement of the brake shoes on the anchor pin 18 will tend to urge the anchor pin 18 axially outwardly, that is to the left as seen in FIG. 4.

Spider member 14 preferably comprises a stamping and is provided with an aperture 14E therethrough at section 14C thereof in which is received a cam shaft support sleeve 102 which is permanently attached as by welding at 104 to the spider. An anti-friction bearing or bushing 106 may be provided in sleeve 102. Anti-friction bushing 106 defines a bore 108 therethrough in which cam shaft 30A is rotatably supported relative to spider 14.

At its opposite end, 14D, spider 14 is provided with a throughbore 14F in which is received an elongated sleeve 110 which is permanently affixed to the spider stamping 14 as at weldment 112. Sleeve 110, preferably of a suitable metallic or plastic material, defines the anchor pin receiving bore 39 therethrough. At its inboard end, anchor pin receiving bore 39 is provided with a first counterbore 114 having a diameter 116. At its outboard end anchor pin receiving bore 39 is provided with a second counterbore 118 having an outer diameter 120. Anchor pin receiving bore 39 defines a central section 121 extending from the first counterbore 114 to the second counterbore 118.

Preferably, sleeves 102 and 110 are provided with shoulders for ease of proper assembly.

Anchor pin 18 is provided with two snap ring receiving grooves 122 and 124 which are axially spaced apart by a distance 126 equal to or slightly less than the axial length of anchor pin retaining bore 39. Sections 36 and 38 of anchor pin 18 are located axially outwardly of snap ring receiving grooves 122 and 124, respectively. Preferably, grooves 122 and 124 are equally spaced from the ends of the anchor pin 18 and are of an equal depth to minimize the possibility of assembly error.

A first snap ring 128 is received within groove 122 and a second snap ring 130 is received within groove 124. As may be seen, the diameter 116 of the inboard counterbore 114 is equal to or slightly greater than the outer diameter of snap ring 128. In any event, the diameter 116 of counter bore 114 is less than the outer diameter of snap ring 128 when snap ring 128 is radially expanded sufficiently to remove same from groove 122 in anchor pin 18. Accordingly, when snap ring 128 is axially aligned with counterbore 114, counterbore 114 will entrap snap ring 128 and prevent removal thereof from anchor pin 18. The outer diameter 120 of outboard counterbore 118 is significantly larger than the outer diameter of snap ring 130 when same is received within groove 124 and is of sufficiently larger dimension to permit radial expansion of snap ring 130 sufficiently to remove same from groove 124 of anchor pin 18. Accordingly, snap ring 130 may be assembled to or removed from anchor pin 18 when snap ring 130 is received within counterbore 118.

As mentioned above, due to the geometry of the spider assembly 100, pivotal movement of the brake shoes 20 about the anchor pin 18 will tend to cause the anchor pin 18 to move in the outboard direction as seen in FIG. 4. Such movement will tend to cause snap ring 128 to remain entrapped within counterbore 114 to retain the anchor pin 18 within the assembly 100. Additionally, the inner diameter surface of counterbore 114 will resist any tendency of the snap ring to wind off the anchor pin 18 due to any rotation of anchor pin 18 within anchor pin retaining bore 39.

Preferably, the axial length of the counterbores 114 and 118 is at least equal to the axial thickness of the snap rings 128 and 130 whereby the outer peripheries of the counterbores will define shoulders to prevent the brake shoe webs from engaging the snap rings.

To remove anchor pin 18 from assembly 100, snap ring 130 is spread radially outwardly, by means of well known and readily available snap ring pliers, sufficiently to disengage the snap ring from groove 124 and the snap ring is then slid leftwardly off of the anchor pin 18. The anchor pin 18 and snap ring 128 may then be slid rightwardly as a unit out of the anchor pin retaining bore 39 and a new anchor pin 18 with a snap ring 128 preassembled thereto may be installed.

In the illustrated embodiment, substantially identical snap rings 128 and 130 are utilized by providing counterbore 118 with a considerably larger diameter 120 than the diameter 116 of counterbore 114. The same result could be achieved, of course, by providing counterbores 114 and 118 with equal diameters and utilizing a snap ring 130 with a smaller outer diameter 131 than the outer diameter of snap ring 128. Of course, counterbores 114 and 118 may be of different sizes as may be snap rings 128 and 130, provided that the diameter of the inboard counterbore is insufficient to allow removal of the inboard snap ring and the diameter of the outboard counterbore is sufficient to allow radially expanding the outboard snap ring sufficient for removal thereof.

It may thus be seen that a drum brake spider assembly with an anchor pin assembly, or anchor pin assemblies, which may be assembled to and/or removed from the spider utilizing commonly available tools, such as a snap ring pliers, and without the requirement of specialized tools, fixtures and for removal of the spider from the vehicle has been provided.

Although the preferred embodiment of the present invention has been described with a certain degree of particularity, it is understood that the present description is by way of example only and in certain rearrangement and/or substitution of the parts is possible without departing from the spirit and the scope of the invention as hereinafter claimed.

I claim:

1. A drum brake spider assembly for expanding shoe drum brakes of the type utilizing brake shoes having a pair of generally parallel radially extending webs straddling the spider, said assembly comprising;

a spider member having a generally centrally located portion adapted for attachment to an axle housing, an actuating member mounting portion at one end thereof and an anchor pin supporting portion at the other end thereof, said anchor pin supporting portion defining a generally annular cross section anchor pin receiving bore therethrough, said anchor pin receiving bore defined by a first counterbored section having a first axial length and a first diameter adjacent the inboard end thereof, a second counterbored section having a second axial length and a second diameter at the outboard end thereof and a central section having a third diameter smaller than both of said first and second diameters extending from said first to said second counterbored sections;

a generally cylindrical anchor pin removably received in said bore, said anchor pin having a length greater than the length of said bore, said anchor pin having a first and a second annular groove about the outer periphery thereof axially spaced apart by a distance substantially equal to the axial separation of said first and second counterbored portions;

a first snap ring received in the annular groove at the inboard end of said anchor pin, said first snap ring having an axial width substantially equal to the axial width of said groove and no greater than said first axial length, said first snap ring defining a first outer diameter when received in said groove smaller than the diameter of said first counterbored section and radially outwardly resiliently expandable to define a second outer diameter for removal of said snap ring from said groove, said second outer diameter greater than the diameter of said first counterbored portion; and a second snap ring received in the annular groove at the outboard end of said annular pin, said second snap ring having an axial width substantially equal to the axial width of said groove and no greater than said second axial length, said second snap ring defining a first outer diameter when received in said groove and radially outwardly resiliently expandable to a second outer diameter sufficient for removal of said snap ring from said groove, said first and second outer diameters of said second snap ring smaller than the diameter of said second counterbored portion, the first outer diameters of both of said snap rings being greater than the diameter of said central section of said anchor pin receiving bore.

2. The drum brake spider assembly of claim 1 wherein both of said first and second annular grooves are spaced from an end of said anchor pin by a substantially equal distance.

3. The drum brake spider assembly of claim 1 wherein said spider member is a one piece stamping, said anchor pin supporting portion of said spider member is provided with an aperture therethrough and a first sleeve member extending through said aperture is permanently affixed to said spider member, said anchor pin retaining bore defined in said sleeve member.

4. The drum brake spider assembly of claim 3 wherein said actuating member mounting portion is provided with a second aperture therethrough, a second sleeve member extending through said aperture is non-removably affixed to said spider member, said second sleeve member defining a throughbore therethrough for rotational support of a cam shaft.

5. The drum brake spider assembly of claim 4 wherein said first and second sleeves are provided with shoulders of greater dimension than said first and second apertures for positioning of said sleeves relative to said spider.

6. The drum brake spider assembly of claim 4 wherein an anti-friction bushing is received within the bore of said second sleeve.

7. The drum brake spider assembly of claim 3 wherein the diameters of said first and second counterbored sections are identical.

8. The drum brake spider assembly of claim 3 wherein the first and second outer diameter of said first and second snap rings are identical.

9. The drum brake spider assembly of claim 3 wherein said anchor pin retaining portion is offset in the outboard direction from said actuating member mounting portion.

* * * * *